(12) United States Patent
Veeningen

(10) Patent No.: US 11,334,547 B2
(45) Date of Patent: May 17, 2022

(54) DATA-OBLIVIOUS COPYING FROM A FIRST ARRAY TO A SECOND ARRAY

(71) Applicant: KONINKLIJKE PHILIPS N.V., Eindhoven (NL)

(72) Inventor: Meilof Geert Veeningen, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 313 days.

(21) Appl. No.: 16/536,356

(22) Filed: Aug. 9, 2019

(65) Prior Publication Data
US 2020/0057755 A1 Feb. 20, 2020

Related U.S. Application Data

(60) Provisional application No. 62/719,933, filed on Aug. 20, 2018.

(51) Int. Cl.
*G06F 16/22* (2019.01)
*H04L 9/32* (2006.01)
(Continued)

(52) U.S. Cl.
CPC ........ *G06F 16/2272* (2019.01); *G06F 21/556* (2013.01); *G06F 21/6218* (2013.01);
(Continued)

(58) Field of Classification Search
CPC ............. G06F 16/2272; G06F 21/6218; G06F 21/556; G06F 21/79; H04L 9/0894;
(Continued)

(56) References Cited

U.S. PATENT DOCUMENTS 7,398,484 B2 * 7/2008 Ruf ..................... G06F 12/0897
711/101
7,657,028 B2 * 2/2010 Avidan ................. H04L 9/3093
380/28

(Continued)

OTHER PUBLICATIONS

Bogdanov D., Laur S., Talviste R. (2014) A Practical Analysis of Oblivious Sorting Algorithms for Secure Multi-party Computation. In: Bernsmed K., Fischer-Hübner S. (eds) Secure IT Systems. NordSec 2014. Lecture Notes in Computer Science, vol. 8788. Springer, Cham, https://doi.org/10.1007/978-3-319-11599-3_4.*

(Continued)

*Primary Examiner* — David Garcia Cervetti

(57) ABSTRACT

Some embodiments are directed to a data retrieval device 210 for data-obliviously copying a subarray of a first array to a second array. The length of the second array is more than one and less than the length of the first array. The length of the subarray is at most the length of the second array. For each first element at a first index in the first array, the data retrieval device selects a second index in the second array for the first index in the first array; data-obliviously computes a choice bit indicative of whether to copy the first element to the second index in the second array; and replaces a second element at the second index in the second array by a replacement element, the replacement element being data-obliviously set to the first element or the second element based on the choice bit.

11 Claims, 7 Drawing Sheets

(51) Int. Cl.
- *H04L 9/08* (2006.01)
- *G06F 21/55* (2013.01)
- *G06F 21/62* (2013.01)

(52) U.S. Cl.
CPC .......... *H04L 9/0894* (2013.01); *H04L 9/3218* (2013.01); *H04L 2209/46* (2013.01); *H04L 2209/50* (2013.01)

(58) Field of Classification Search
CPC ............... H04L 9/3218; H04L 2209/50; H04L 2209/46; H04L 9/003
See application file for complete search history.

(56) References Cited

U.S. PATENT DOCUMENTS

| | | | |
|---|---|---|---|
| 9,635,011 B1* | 4/2017 | Wu | H04L 9/0861 |
| 2009/0150599 A1* | 6/2009 | Bennett | G06F 11/1471 |
| | | | 711/103 |
| 2009/0193033 A1* | 7/2009 | Ramzan | H04L 9/3013 |
| 2009/0307657 A1* | 12/2009 | Farrugia | G06F 21/6218 |
| | | | 717/110 |
| 2010/0211787 A1* | 8/2010 | Bukshpun | H04L 9/065 |
| | | | 713/170 |
| 2011/0040820 A1* | 2/2011 | Rane | H03M 13/1111 |
| | | | 708/441 |
| 2012/0221788 A1* | 8/2012 | Raghunathan | G06F 17/16 |
| | | | 711/114 |
| 2013/0124783 A1* | 5/2013 | Yoon | G11C 13/0069 |
| | | | 711/103 |
| 2013/0301352 A1* | 11/2013 | Shim | G11C 11/5628 |
| | | | 365/185.03 |
| 2014/0105385 A1* | 4/2014 | Rane | H04L 9/0819 |
| | | | 380/30 |
| 2014/0189364 A1* | 7/2014 | Kolesnikov | G06F 12/1408 |
| | | | 713/189 |
| 2016/0004874 A1 | 1/2016 | Ioannidis et al. | |
| 2016/0092228 A1* | 3/2016 | Gschwind | G06F 5/01 |
| | | | 711/110 |
| 2016/0092241 A1* | 3/2016 | Gschwind | G06F 9/3001 |
| | | | 712/22 |
| 2016/0147808 A1* | 5/2016 | Schreter | G06F 16/319 |
| | | | 707/696 |
| 2016/0330180 A1* | 11/2016 | Egorov | G06F 21/14 |
| 2016/0350000 A1* | 12/2016 | Ordentlich | G06F 3/0644 |
| 2017/0091271 A1* | 3/2017 | Attaluri | G06F 16/2255 |
| 2017/0177346 A1* | 6/2017 | Gokhale | G06F 9/30047 |
| 2017/0372226 A1* | 12/2017 | Costa | G06F 21/60 |
| 2018/0205552 A1* | 7/2018 | Struttmann | H04L 9/3242 |
| 2018/0314847 A1* | 11/2018 | Yeo | H04L 9/085 |
| 2019/0310799 A1* | 10/2019 | Yeo | G06F 3/0659 |
| 2019/0377884 A1* | 12/2019 | Mandal | H04L 9/0643 |
| 2020/0014404 A1* | 1/2020 | Mendel | H04L 9/003 |

OTHER PUBLICATIONS

Laud, Peeter. (2015). Parallel Oblivious Array Access for Secure Multiparty Computation and Privacy-Preserving Minimum Spanning Trees. Proceedings on Privacy Enhancing Technologies. 2015. 10.1515/popets-2015-0011.*

Veeningen M. (2017) Pinocchio-Based Adaptive zk-SNARKs and Secure/Correct Adaptive Function Evaluation. In: Joye M., Nitaj A. (eds) Progress in Cryptology—AFRICACRYPT 2017. AFRICACRYPT 2017. Lecture Notes in Computer Science, vol. 10239. Springer, Cham. https://doi.org/10.1007/978-3-319-57339-7_2.*

Hoogh, de, PhD thesis. "Design of large scale applications of secure multiparty computation: secure linear programming". Eindhoven University of Technology. 2012.

Damgard, I. et al., "Multiparty Computation from Somewhat Homomorphic Encryption". Proceedings of CRYPTO (2012).

Parno, B. et al., "Pinocchio: Nearly Practical Verifiable Computation", Proceedings of the IEEE SAymposium on Security and Privacy (2013).

Valarray Slice Selector. http://www.cplusplus.com/reference/valarray/slice.

Program for array rotation. https://www.geeksforgeeks.org/array-rotation/GeeksforGeeks.

* cited by examiner

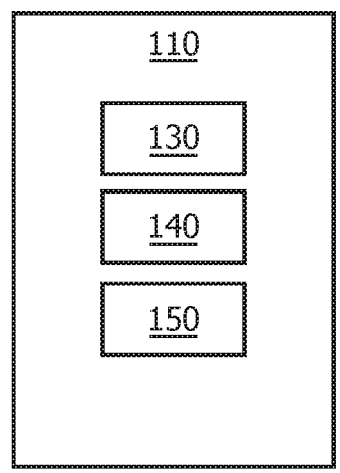
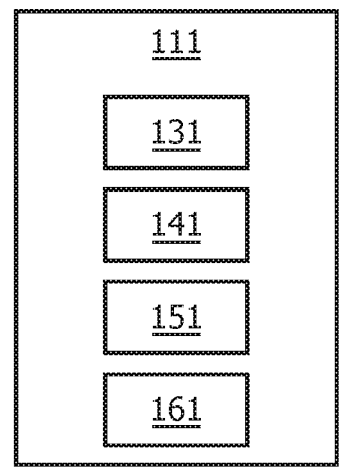
FIG. 1a    FIG. 1b
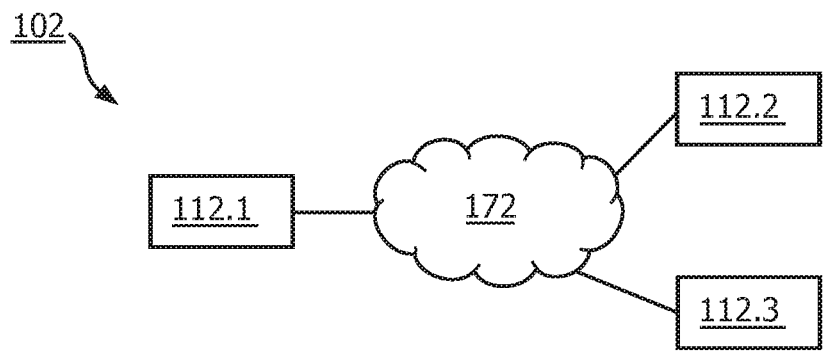
FIG. 1c
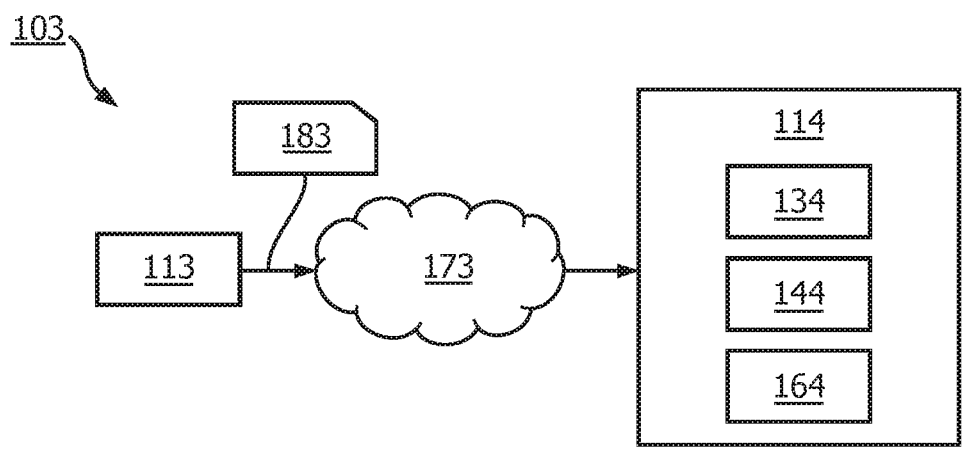
FIG. 1d

DATA-OBLIVIOUS COPYING FROM A FIRST ARRAY TO A SECOND ARRAY

FIELD OF THE INVENTION

The invention relates to a data retrieval device, a data writing device, a retrieval verification device, a writing verification device, a data retrieval method, a data writing method, and a computer readable medium.

BACKGROUND

In various settings in which data is processed, it is useful to employ data-oblivious techniques in order to prevent leakage of sensitive data during the processing. For instance, when a program run on a computer accesses data from a memory or a storage, and the particular memory or storage accesses that the program does depends on sensitive data, it has been found possible to extract information about this sensitive data that leaks through various kinds of side-channels such as cache timing, power usage, and/or acoustic side-channels. Such leakage may be prevented or at least reduced by using data-oblivious algorithms, e.g., algorithms whose memory and/or storage accesses do not depend on sensitive data. As another example, using data-oblivious algorithms is beneficial in combination with cryptographic techniques such as multi-party computation, that allows multiple parties to compute a join function on respective sensitive inputs without the need to disclose the inputs, or verifiable computation, that allows one party to prove to another party that a computation was performed correctly without the other party needing to re-do the computation or necessarily learn all its inputs.

A known technique for data-obliviously copying elements from an array is secret indexing, as described in "Design of large scale applications of secure multiparty computation: secure linear programming", S. de Hoogh, PhD thesis, Eindhoven University of Technology (incorporated herein by reference) in the context of multi-party computation. Secret indexing allows to retrieve an element of an array in a way that is data-oblivious with respect to the index of the element. For instance, in order to access an element $a_i$ at index i of array $a_0 \ldots, a_{N-1}$, index i may be data-obliviously converted to an array $(\delta_0, \ldots, \delta_{N-1})$, and the value of element $a_i$ may then be determined by data-obliviously computing $a_i = \delta_0 a_0 + \ldots + \delta_{N-1} a_{N-1}$. The same technique is also known in verifiable computation, e.g., in the pysnark.lib.Array._getitem_ method of PySNARK, as available on https://github.com/Charterhouse/pysnark/ (incorporated herein by reference).

However, a disadvantage of secret indexing is that it only allows to retrieve a single element from the array. In particular, secret indexing does not allow to copy a subarray from the array to a second array in a way that is efficient and/or data-oblivious with respect to the length of the subarray. Therefore, there is a need to overcome these limitations of techniques for data-obliviously coping elements from an array.

SUMMARY OF THE INVENTION

A data retrieval device for data-obliviously copying a subarray of a first array to a second array is proposed as defined in the claims. The length of the second array is more than one and less than the length of the first array. The length of the subarray is at most the length of the second array. For each first element at a first index in the first array, the data retrieval device selects a second index in the second array and replaces a second element at the second index in the second array by a replacement element set either to the first element or the second element. Interestingly, different second indices are selected for first indices of the first array that differ by less than the length of the subarray, which contributes to a more efficient data-oblivious computation, e.g., by means of a linear scan through the first array.

In an embodiment, the copying is data-oblivious with respect to at least one of a starting index of the subarray in the first array and an ending index of the subarray in the first array. In an embodiment, the second index is a function of the first index or the first index and the second index are functions of a counter variable, e.g., in an embodiment, the second index is the first index modulo the length of the second array.

In an embodiment, the data retrieval device data-obliviously computes a starting index of the subarray in the second array. In an embodiment, the data retrieval device obtains a subarray index of a target element in the subarray and uses the starting index to data-obliviously retrieve the target element from the second array. Interesting, having copied the subarray to the second array, retrieving the target element from the second array may be more efficient than retrieving it from the first array. In an embodiment, the data retrieval device data-obliviously shifts elements of the second array based on the starting index such that the second array starts with the subarray after the shifting.

In an embodiment, the data retrieval device copies the subarray of the first array to the second array as a multi-party computation with one or more other data retrieval devices. The second array and at least one of a starting index of the subarray in the first array and an ending index of the subarray in the first array are private values of the multi-party computation. This contributes to efficiently obtaining the second array without leaking the location and/or length of the subarray.

In an embodiment, the data retrieval device copies the subarray of the first array to the second array as a verifiable computation. A cryptographic verifiable computation proof proves that element computations were performed correctly. The second array and at least one of a starting index of the subarray in the first array and an ending index of the subarray in the first array are private values of the verifiable computation. The data retrieval device sends the cryptographic verifiable computation proof to a retrieval verification device. This allows to more efficiently prove that the second array was correctly obtained, e.g., without leaking the location of the subarray.

A further aspect of the invention provides a retrieval verification device as defined by the claims that receives a cryptographic verifiable computation proof from the data retrieval device and verifies it, allowing it to obtain guarantees about correctness of copying of a subarray without needing to redo the copying and/or without learning information about sensitive inputs.

Further aspects of the invention provide a data writing device and a writing verification device as defined by the claims. The data writing device is for data-obliviously copying a second array to a subarray of a first array which may be performed efficiently despite the computation being data-oblivious with respect to the location of the subarray in the first array. The data writing device may perform the copying as a verifiable computation, the writing verification device verifying the resulting cryptographic verifiable computation proof, allowing it to obtain correctness guarantees without needing to redo the copying and/or without learning information about sensitive inputs.

The data retrieval device, the retrieval verification device, his data writing device, and the writing verification device are electronic devices; they may be computers. The data retrieval method and the data writing method described herein may be applied in a wide range of practical applications. Such practical applications include devices providing secure access to remote storage, data-oblivious cloud data processing device, etc.

Further aspects of the invention provide a data retrieval method and a data writing method as defined by the claims. Embodiments of the methods may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the data retrieval and/or data writing method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a data retrieval device, FIG. 1b schematically shows an example of an embodiment of a data retrieval device, FIG. 1c schematically shows an example of an embodiment of a data retrieval system, FIG. 1d schematically shows an example of an embodiment of a data retrieval system, FIG. 1e schematically shows an example of an embodiment of a data writing device, FIG. 1f schematically shows an example of an embodiment of a data writing device, FIG. 1g schematically shows an example of an embodiment of a data writing system, FIG. 1h schematically shows an example of an embodiment of a data writing system, FIG. 2a schematically shows an example of an embodiment of a data retrieval device, FIG. 2b schematically shows an example of an embodiment of a first array and a second array, FIG. 3a schematically shows an example of an embodiment of a data retrieval device, FIG. 3b schematically shows an example of an embodiment of a data retrieval device, FIG. 4a schematically shows an example of an embodiment of a data writing device, FIG. 4b schematically shows an example of an embodiment of a data writing device, FIG. 5a schematically shows an example of an embodiment of a data retrieval method, FIG. 5b schematically shows an example of an embodiment of a data writing method, FIG. 6a schematically shows a computer readable medium having a writable part comprising a computer program according to an embodiment, FIG. 6b schematically shows an exemplary hardware diagram for implementing a device according to an embodiment.

LIST OF REFERENCE NUMERALS 102, 103 a data retrieval system
107, 108 a data writing system
110-113 a data retrieval device
114 a retrieval verification device
115-118 a data writing device
119 a writing verification device
130-139 a processor
140-149 a memory
150-156 a storage
161-169 a communication interface
172-178 a network
183, 188 a cryptographic verifiable computation proof
210 a data retrieval device
231 a selection unit
232 a choice unit
233 a replacement unit
241 a starting index of the subarray in the first array
242 a first index
243 an ending index of the subarray in the first array
244 a second index
245 a choice bit
246 a starting index
247 a replacement element
261, 261' a first array
262 a subarray of the first array
263 a first element
264, 264' a second array
265 a second element
310, 310' a data retrieval device
334 a translation unit
335 a retrieval unit
336 a shift checking unit
337 a shifting unit
345 a subarray index
346, 346' a starting index
347 a translated index
348, 365 a target element
349 a shift bit
361, 361' a first array
362, 362' a subarray of the first array
364, 364' a second array
415, 415' a data writing device
431, 431' a selection unit
432 a choice unit
433 a replacement unit
436 a shift checking unit
437 a shifting unit
442, 442' a first index 444, 444' a second index
445 a choice bit
447 a replacement element
461, 461' a first array
462, 462' a subarray of the first array
463 a first element
464, 464' a second array
465 a second element
466 a starting element
800 a data retrieval method
810 selecting a second index
820 data-obliviously computing a choice bit
830 replacing a second element
900 a data writing method
910 selecting a second index
920 data-obliviously computing a choice bit
930 replacing a first element
1000 a computer readable medium
1010 a writable part
1020 a computer program
1100 a device
1110 a system bus
1120 a processor
1130 a memory
1140 a user interface
1150 a communication interface
1160 a storage
1161 an operating system
1162, 1163, 1164 instructions

DETAILED DESCRIPTION OF THE EMBODIMENTS

Figure 1E:
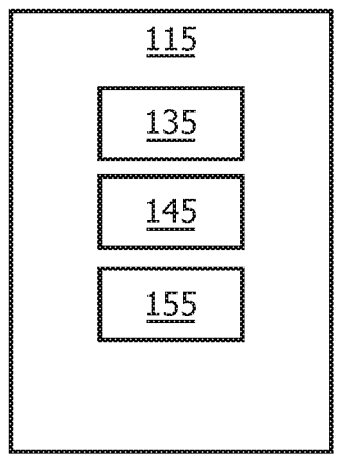

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a and FIG. 1b schematically show possible embodiments of data retrieval devices for data-obliviously copying a subarray of a first array to a second array. Data retrieval device 110 shown in FIG. 1a comprises a processor 130, a memory 140, and a storage 150. Data retrieval device 111 shown in FIG. 1b comprises a processor 131, a memory 141, a storage 151, and a communication interface 161. For example, memories 140, 141 may comprise software and/or data on which respective processors 130, 131 are configured to act. Processors 130, 131 may be implemented as one or more processor circuits, e.g., microprocessors, ASICs, FPGAs, and the like. The processors may be provisioned, e.g., within a cloud computing architecture, etc. Further examples are shown herein. Memories 140, 141 may comprise computer program instructions which are executable by respective processors 130, 131. Processors 130, 131, possibly together with respective memories 140, 141, are configured according to an embodiment of a data retrieval device. Storages 150, 151 may be implemented as a memory, e.g., storage 150 is part of memory 140, as a locally stored database, and/or as an external database. For example, storage 150 comprises an interfacing storage that connects to an external database, e.g., in cloud storage. For example, when an array element is needed, the interfacing storage may be asked for it, after which it may be retrieved, e.g., from the external database. The latter may be transparent to the rest of device 110.

FIG. 1c schematically shows an example of an embodiment of a data retrieval system 102. Data retrieval system 102 comprises one or more data retrieval devices, e.g., data retrieval device 112.1, 112.2, or 112.3, for data-obliviously copying a subarray of a first array to a second array as a multi-party computation with each other, the second array and at least one of a starting index of the subarray and an ending index of the subarray in the first array being private values of the multi-party computation. The data retrieval devices, e.g., data retrieval device 112.1, 112.2, or 112.3, may each be configured as data retrieval device 110 or 111.

The data retrieval devices, e.g., data retrieval devices 112.1, 112.2, and 112.3, are connected by a computer network 172. The computer network may be an internet, an intranet, a LAN, a WLAN, etc. The computer network may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. Data retrieval devices, e.g., device 112.1, 112.2 or 112.3, may comprise communication interfaces, e.g., communication interface 161 in FIG. 1b, which are arranged to communicate with other devices of system 102 as needed. For example, the communication interface may comprise a connector, e.g., a wired connector, e.g., an Ethernet connector, or a wireless connector, e.g., an antenna, e.g., a Wi-Fi, 4G or 5G antenna. The computer network may comprise known elements such as, e.g., a router, a hub, etc. Communication may be in the form of digital messages, e.g., sent and received in electronic form. Although FIG. 1c shows three data retrieval devices, other numbers of data retrieval devices are also possible, e.g., two, five, or ten data retrieval devices.

FIG. 1d schematically shows an example of an embodiment of a data retrieval system 103. Data retrieval system 103 comprises data retrieval device 113 and retrieval verification device 114, connected by a computer network 173. Data retrieval device 113 may be configured to send a cryptographic verifiable computation proof 183 to retrieval verification device 114 over computer network 173. The proof may prove that a subarray of a first array was copied correctly to a second array. Retrieval verification device 114 may be configured to verify correct copying by receiving the cryptographic verifiable computation proof 183 and verifying the proof.

Retrieval verification device 114 comprises a processor 134, a memory 144, and a communication interface 164. For example, memory 144 may comprise software and/or data on which processor 134 is configured to act. Processor 134 and/or memory 144 may be implemented similarly to processors 130, 131 and memories 140, 141 as described above. Data retrieval device 113 may be data retrieval device 110 or 111. Data retrieval device 113 and retrieval verification device 114 in data retrieval system 103 may communicate with each other over computer network 173. Computer network 173 and communication interfaces of data retrieval device 113 and retrieval verification device 114 may be implemented similarly to the computer network and communication interfaces in FIG. 1c. Although not shown in FIG. 1d, apart from devices 113, 114, data retrieval system 103 may be configured with additional devices.

Figure 1F:
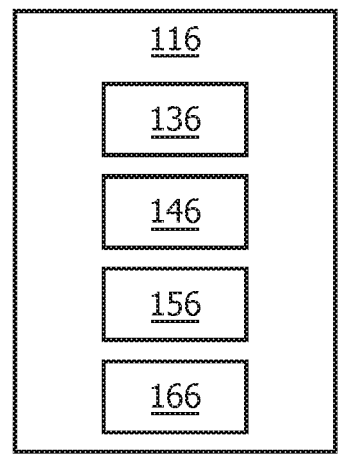

FIG. 1e and FIG. 1f show examples of embodiments of data writing devices 115, 116 for data-obliviously copying a second array to a subarray of a first array. Data writing device 115 comprises a processor 135, a memory 145, and a storage 155, with functions analogous to those of respective components of data retrieval device 110. Data writing device 116 comprises a processor 136, a memory 146, a storage 156, and a communication interface 166, with functions analogous to those of respective components of data retrieval device 111. Processors 135, 136, possibly together with respective memories 145, 146, are configured according to an embodiment of a data writing device.

Figure 1G:
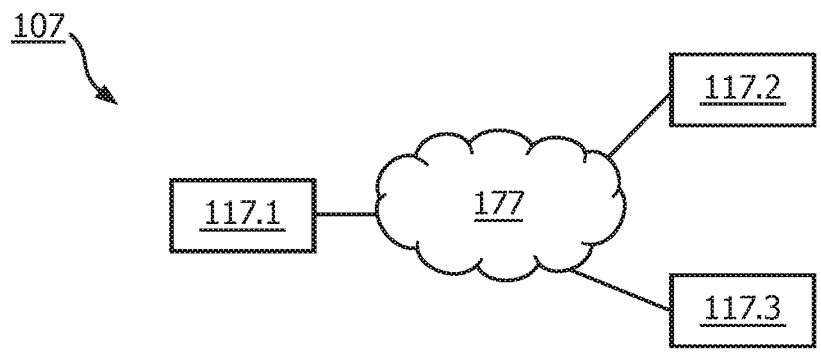

FIG. 1g schematically shows an example of an embodiment of a data writing system 107. Data writing system 107 comprises one or more data writing devices, e.g., data writing device 117.1, 117.2, or 117.3, for data-obliviously copying a second array to a subarray of a first array as a multi-party computation with each other, the second array and at least one of a starting index of the subarray and an ending index of the subarray in the first array being private values of the multi-party computation. The data writing devices, e.g., data retrieval device 117.1, 117.2, or 117.3, may each be configured as data writing device 115 or 116. The data writing devices are connected by a computer network 177 similarly to computer network 172 in FIG. 1c. Although FIG. 1g shows three data writing devices, other numbers of data writing devices are also possible, e.g., two, five, or ten data writing devices.

Figure 1H:
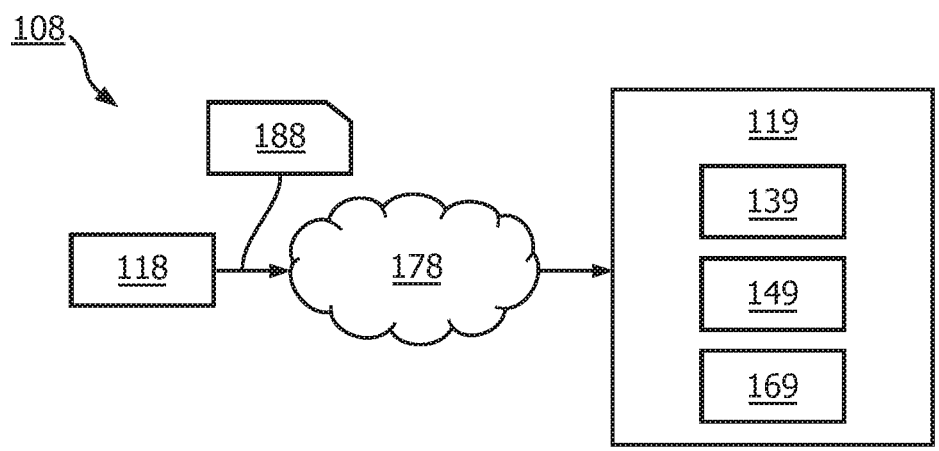

FIG. 1h schematically shows an example of an embodiment of a data writing system 108. Data writing system 108 comprises data writing device 118 and writing verification device 119, connected by a computer network 178. Data writing device 118 may be configured to send a cryptographic verifiable computation proof 188 to writing verification device 119 over computer network 178. The proof may prove that a second array was data-obliviously copied to a subarray of a first array. Writing verification device 119 may be configured to verify correct copying by receiving the cryptographic verifiable computation proof 188 and verifying the proof.

Writing verification device 119 comprises processor 139, memory 149, and communication interface 169. For example, memory 149 may comprise software and/or data on which processor 139 is configured to act. Processor 139 and/or memory 149 may be implemented similarly to processors 130, 131 and memories 140, 141 as described above. Data writing device 118 may be configured as data writing device 115 or 116. Data writing device 118 and writing verification device 119 in data writing system 108 may communicate with each other over computer network 178. Computer network 178 and communication interfaces of data writing device 118 and writing verification device 119 may be implemented similarly to the computer network and communication interfaces in FIG. 1c. Although not shown in FIG. 1h, apart from devices 118, 119, data writing system 108 may be configured with additional devices.

FIG. 2a, 3a, 3b, 4a, 4b below show functional units that may be functional units of processors. For example, FIG. 2a may be used as a blueprint of a possible functional organization of the processor. The processors are not shown separate from the units in the figures but are shown in devices 110, 111, 115, and 116 in FIG. 1a-FIG. 1f. For example, the functional units shown in FIG. 2a, 3a, 3b may be wholly or partially implemented in computer instructions that are stored at device 110, e.g., in an electronic memory of device 110, and are executable by a microprocessor of device 110, and similarly for device 111, whereas the functional units shown in FIG. 4a, 4b may be wholly or partially implemented in computer instructions that are stored at device 115, e.g., in an electronic memory of device 115, and are executable by a microprocessor of device 115, and similarly for device 116. In hybrid embodiments, functional units are implemented partially in hardware, e.g., as coprocessors, e.g., crypto processors, and partially in software stored and executed on device 110, 111, 115, and/or 116.

Figure 2A:
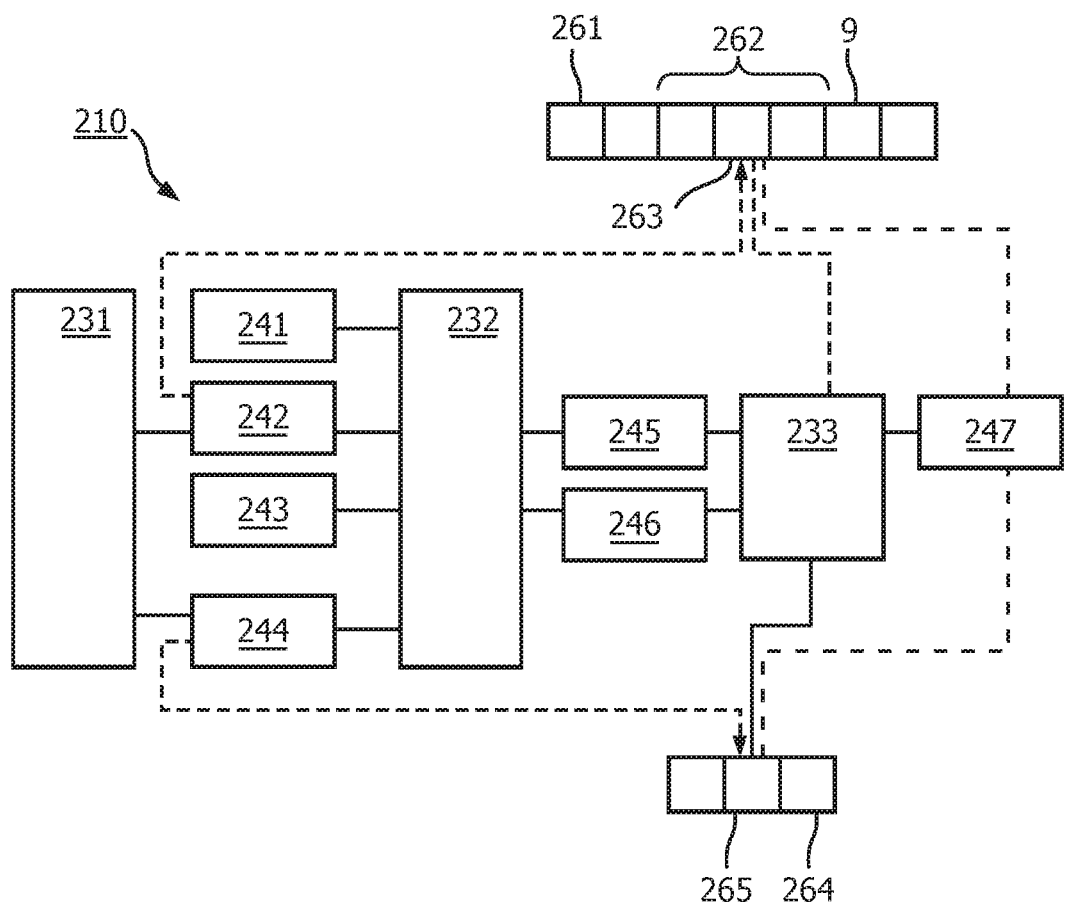

FIG. 2a schematically shows an example of an embodiment of a data retrieval device 210. Data retrieval device is for data-obliviously copying a subarray 262 of a first array 261 to a second array 264. As pointed out above, FIG. 2a shows functional units which may be implemented by the processor, e.g., processor 130 of data retrieval device 110. FIG. 2a also shows some data elements for the purpose of explication.

Data retrieval device 210 may comprise a storage (not shown separately) configured to store the first array 261 and the second array 264. Subarray 262 may comprise zero or more subsequent elements of first array 261, e.g., subarray 262 is defined by a starting index 241 in the first array, e.g., a smallest index of an element of the subarray, and a length; by an ending index 243 in the first array, e.g., a largest index of an element of the subarray, and a length; and/or a starting index 241 and an ending index 243 in the first array. The length of second array 264 is more than one and less than the length of first array 261. The length of subarray 262 is at most the length of second array 264. In an embodiment, the length of subarray 262 is equal to the length of second array 264. In an embodiment, the length of subarray 262 is more than one.

Data-obliviously copying subarray 262 of first array 261 to second array 264 may comprise copying the subarray in such a way that the accesses made to first array 261 and/or second array 264 in storage are the same regardless of the location of subarray 262 in first array 261, e.g., regardless of a starting and/or ending index of subarray 262. This may have the advantage of making data retrieval device 210 less susceptible to side-channel analysis and/or allowing data retrieval device 210 to perform the copying using cryptographic techniques such as multi-party computation and/or verifiable computation. In an embodiment, the copying is data-oblivious with respect to at least one of a starting index 241 of subarray 262 in first array 261 and an ending index 243 of subarray 262 in the first array 261, e.g., copying a subarray of a given length may induce the same or similar access patterns to first array 261 and second array 264 in the storage regardless of the starting index or ending index of subarray 262 in the first array 261.

Data retrieval device 210 may comprise a selection unit 231, a choice unit 232, and/or a replacement unit 233 that together perform an element computation for each first element 263 at a first index 242 in first array 261. As part of the element computation, selection unit 231 may select a second index 244 in second array 264 for first index 242 in first array 261, wherein different second indices are selected for first indices of the first array that differ by less than the length of the subarray. Choice unit 232 may data-obliviously computing a choice bit 245 indicative of whether to copy first element 263 to second index 244 in second array 264, wherein choice bit 245 at least indicates if subarray 262 comprises first element 263. Moreover, replacement unit 233 may replace a second element 265 at second index 244 in second array 264 by a replacement element 247, replacement element 247 being data-obliviously set to first element 263 or second element 265 based on choice bit 245.

In an embodiment, the element computation is performed for each first element 263 at a first index 242 in first array 261 by iterating through the first array linearly, e.g., iterating from the beginning to the end of first array 261, or iterating from the end to the beginning of first array 261. However, this is not necessary; data retrieval device 210 may employ any access pattern in which each element of the first array 263 is accessed at least once, e.g., first iterating through elements with even indices and then iterating through elements with odd indices. Interestingly, the access pattern may be independent from the location of subarray 262 in the first array, e.g., independent from starting index 241 and/or ending index 243. In particularly advantageous embodiments, each element of the first array is accessed exactly once.

Data retrieval device 210 may comprise a selection unit 231 that, for each first index 242 in first array 261, selects a second index 244 in second array 264. Selection unit 231 may select different second indices for first indices of the first array that differ by less than the length of the subarray. For example, if exactly one element computation is performed for each element of the first array, then whenever two first indices $i_1$, $i_2$ differ by less than the length n of the subarray, e.g., $0<|i_1-i_2|<n$, then the respective second indices $j_1$, $j_2$ selected for first indices $i_1$, $i_2$ may be different, e.g., $j_1 \neq j_2$. Similarly, if multiple element computations are performed for each element of the first array, then for each pair of distinct indices $i_1$, $i_2$ that differ by less than the length n of the subarray, e.g., $0<|i_1-i_2|<n$, then there may exist a first element computation in which a second index $j_1$ is selected for first index $i_1$ and a second element computation in which a second index $j_2$ is selected for first index $i_2$ such that the respective second indices are different, e.g., $j_1 \neq j_2$. This may have as an advantage that each element of subarray 262 may be copied at one point to a different index of second array 264, hence, after the element computations, all elements of subarray 262 may be copied to second array 264. Interestingly, the second index may be selected independently of starting index 241 and/or ending index 243.

Various ways for selection unit 231 to select second index 244 for first index 242 are possible. In an embodiment, second index 244 is a function of first index 242 or first index 242 and second index 244 are functions of a counter variable. In an embodiment, second index j 244 is defined as a function of first index i 242 by defining second index j 244 as first index i 242 modulo the length m of second array 264, e.g., j=i mod m, or modulo the length n of subarray 262, e.g., j=i mod n. In an embodiment, the element computation is performed by iterating through first array 261 linearly, e.g., by means of a counter variable k ranging from 0 to length N of first array 261, exclusive, and first index i=k 242 and second index j=k mod m or j=k mod n are both defined as functions of counter variable k.

Figure 2B:
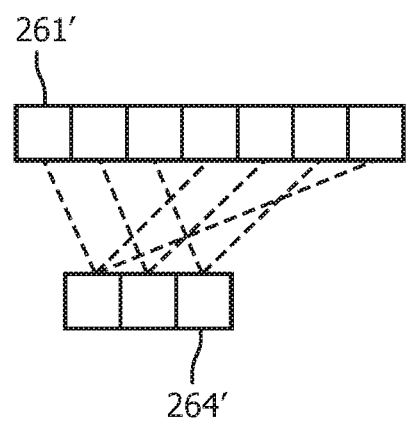

Second index 244 being first index 242 modulo the length of second array 264 may have as an advantage that the choice of second index 244 is independent of the length as well as the position of subarray 262 in first array 261, for example, copying subarray 262 to second array 264 is performed data-obliviously with respect to the length of the subarray. Embodiments wherein second index 244 is first index 242 modulo the length of second array 264 are illustrated in FIG. 2b. FIG. 2b shows, by way of example, an example of an embodiment of a first array 261' of length seven and a second array 264' of length three. A dashed line from an element at a first index of first array 261' to an element at a second index of second array 264' indicates that the second index may be selected for the first index by selection unit 231. In this example, the second index is equal to the first index modulo the length of the second array, for example, for the first, fourth, and seventh element of the first array, with indices 0, 3, and 6, respectively, the first element of the second array, with index 0, is selected; and similarly for other elements.

However, various other ways to select second index 244 are possible as well. For instance, instead of function j=i mod m to define second index 244 from first index 242, also functions j=i+1 mod m, j=i+2 mod m, etcetera, or j=α·i mod m with α, m coprime may be chosen, and similarly, instead of functions i=k, j=k mod m, also functions i=k+1 mod N, k=αk+β mod m may be chosen, etcetera. Selection unit 231 also does not need to select second index 244 by computing it as a function, e.g., in each element computation, it may read out the current value of second index 244; increment it; check whether it equals the length of second array 264, and if so, reset it to zero; and store it.

Data retrieval device 210 may further comprise a choice unit 232 that data-obliviously computes choice bit 245 indicative of whether to copy first element 263 to second index 244 in second array 264. Choice bit 245 may at least indicate if subarray 262 comprises first element 263. For instance, choice unit 232 may set choice bit 245 if subarray 262 comprises first element 263 and reset it otherwise. For example, choice unit 232 may obtain a starting index 241 of the subarray in the first array, e.g., a smallest index of an element of the subarray, and an ending index 243 of the subarray in the first array, e.g., a largest index of an element of the subarray. For example, choice unit 232 may obtain one or more of starting index 241 and ending index 243 as inputs, e.g., by the user, or upon request by another component of data retrieval device 210. For instance, choice unit 232 obtains starting index 241 and length n of the subarray and computes ending index 243 therefrom; choice unit 232 obtains ending index 243 and length n of the subarray and computes starting index 241 therefrom; or choice unit 232 obtains both starting index 241 and ending index 243 of the subarray. For example, in the example shown in FIG. 2a, starting index 241 may be two and ending index 243 may be four.

For example, choice unit 232 may determine choice bit c 245 by setting it if first index i 242 is larger than or equal to starting index $i_s$ 241 and smaller than or equal to ending index $i_e$ 243. This may have as an advantage that all elements of subarray 262 will be written to second array 264 in at least one element computation. For example, choice unit 232 may perform a data-oblivious comparison of first index 242 to starting index 241, e.g., $c_1=[i \geq i_s]$ where $c_1$ is set to 1 if $i \geq i_s$ and to 0 otherwise; a data-oblivious comparison of first index 242 to ending index 243, e.g., $c_2=[i \leq i_e]$ where $c_2$ is set to 1 if $i \leq i_e$ and to 0 otherwise, and data-obliviously combine them to obtain choice bit c 245, e.g., $c=[c_1] \cdot [c_2]$. For example, the processor of data retrieval device 210 may support less-than-equal, greater-than-equal, and/or multiplication as data-oblivious, e.g., constant-time, operations, or less-than-equal, greater-than-equal and/or multiplication are performed as data-oblivious operations in a multi-party computation or verifiable computation, various examples of which are provided below.

In an embodiment, choice bit c 245 initially indicates to copy first elements to the second indices in second array 264, e.g., the bit is initially set, e.g., c=1, and is changed by choice unit 232 to indicate not to copy first elements to second indices in second array 264 after element computations have been performed for all elements of subarray 262, e.g., the bit is reset, e.g., c=0. For example, choice unit 232 data-obliviously compares first index 242 to ending index 243. For instance, choice unit 232 checks if first index 242 is equal to ending index 243 plus one, e.g., [i=$i_e$+1], and if so, changes, e.g., resets, choice bit c 245, e.g., c=[c]-[i=$i_e$+1], to indicate not to copy first elements to second indices in the current element computation or subsequent element computations. Or, choice unit 232 data-obliviously checks if first index 242 equals ending index 243, e.g., [i=$i_e$], and if so, changes, e.g., resets, choice bit 245, e.g., c=[c]-[i=$i_e$] 245, to indicate not to copy first elements to second indices in the second array in subsequent element computations. If element computations are performed in increasing order of first index, this may result in elements of the subarray being copied to the second array without being overwritten later. Similarly, choice unit 232 may data-obliviously compare first index 242 to starting index 241, e.g., in combination with performing element computations in decreasing order of first index. In any case, using a data-oblivious equality check, e.g., [i=$i_e$], [i=$i_e$+1], or the like, instead of a data-oblivious less-than-equal or larger-than-equal check, may have the advantage that it is more efficient, e.g., when performed as a multi-party computation or a verifiable computation.

For example, in the example given in FIG. 2a, starting index 241 may be two, ending index 243 may be four, and element computations may be performed for first indices 242 in ascending order, in which selection unit 231 and choice unit 232 select second index 244 as first index 242 modulo the length of second array 264 and compute choice bit 245 by comparing first 242 index to ending index 243 of subarray 262, according to the following table:

TABLE 1

Example values in element computations

| element computation # | first index 242 | second index 244 | choice bit 245 |
|---|---|---|---|
| 1 | 0 | 0 | 1 |
| 2 | 1 | 1 | 1 |
| 3 | 2 | 2 | 1 |
| 4 | 3 | 0 | 1 |
| 5 | 4 | 1 | 1 |
| 6 | 5 | 2 | 0 |
| 7 | 6 | 0 | 0 |

For example, in the example in Table 1, second index 244 may be computed as first index 242 modulo length three of second array 264. Choice bit 245 may be initially set and reset in the sixth element computation when first index 242 is equal to ending index 243 plus one.

Data retrieval device 210 may further comprise a replacement unit 233 that replaces second element 265 at second index 244 in second array 264 by a replacement element 247. Replacement unit 233 may data-obliviously set replacement element 247 to first element $a_i$ 263 or second element $b_1$ 265 based on choice bit c 245. For example, replacement unit 233 may set replacement element r 247 to first element $a_i$ 263 if the choice bit is set, e.g., c=1, and to second element $b_j$ if the choice bit is not set, e.g., c=0, e.g., by computing r=c·$a_i$+(1−c)·$b_j$, r=$b_j$+c·($a_i$·$b_j$), or the like. In any case, replacement unit 233 may set replacement element r 247 to the first element if choice bit 245 indicates that subarray 262 comprises first element 263, thereby ensuring that second element 265 is replaced by first element 263 if first element 263 is comprised in subarray 262. Having data-obliviously set replacement element 247, replacement unit 233 may replace second element 265, e.g., in the storage of data retrieval device 210, by replacement element 247.

In an embodiment, replacement unit 233 applies a function to replacement element r 247 prior to replacing second element 265 by the replacement element, e.g., a function $f$ depending on first index i 242 and/or second index j 244, e.g., $f(r)=r^2+i$. In an embodiment, replacement unit 233 also replaces first element 263 at the first index in the first array by a second replacement element, the second replacement element being data-obliviously set to first element 263 or second element 265 based on a second choice bit, e.g., choice bit 245 or another choice bit indicative of whether to copy second element 265 at the second index in the second array to first index 242 in the first array, e.g., wherein the second choice bit may be set if subarray 262 comprises first element 263. For example, replacement unit 233 may data-obliviously swap first element 263 and second element 265 based on choice bit 245, e.g., if choice bit 245 is set.

For example, selection unit 231, choice unit 232, and replacement unit 233 may interact to copy subarray [2 3 4], 262 of first array [0 1 2 3 4 5 6], 261 with starting index 2, 241 and ending index 4, 243 to second array [99 99 99], 264, as shown in Table 2 below. Each row in Table 2 may represent an element computation. Respective columns may represent first array 261, with first element 263 underlined; second array 264 before the element computation has been carried out, with second element 265 underlined; first index 242; second index 244; choice bit 245; replacement value 247; and second array 264 after the element computation has been carried out, with second element 265 underlined.

TABLE 2

Example values in element computations

| 1st array 261 | 2nd arr 264 (b) | 1st ix 242 | 2nd ix 244 | ch bit 245 | rep v 247 | 2nd arr 264 (a) |
|---|---|---|---|---|---|---|
| [0 1 2 3 4 5 6] | [99 99 99] | 0 | 0 | 1 | 0 | [0 99 99] |
| [0 1 2 3 4 5 6] | [0 99 99] | 1 | 1 | 1 | 1 | [0 1 99] |
| [0 1 2 3 4 5 6] | [0 1 99] | 2 | 2 | 1 | 2 | [0 1 2] |
| [0 1 2 3 4 5 6] | [0 1 2] | 3 | 0 | 1 | 3 | [3 1 2] |
| [0 1 2 3 4 5 6] | [3 1 2] | 4 | 1 | 1 | 4 | [3 4 2] |
| [0 1 2 3 4 5 6] | [3 4 2] | 5 | 2 | 0 | 2 | [3 4 2] |
| [0 1 2 3 4 5 6] | [3 4 2] | 6 | 0 | 0 | 3 | [3 4 2] |

In this example, second index 244 and choice bit 245 may be determined as in Table 1. Replacement value 247 may be set to first element 263 if choice bit 245 is equal to one and to second element 265 if choice bit 245 is equal to zero. This may have the effect that elements of first array 261 are copied to second array 264 until the end of subarray 262 has been reached, which may result in all elements of subarray 262 being copied to second array 264.

In an embodiment, choice unit 232 is further configured to data-obliviously compute a starting index 246 of subarray 262 in second array 264, e.g., an index in second array 264 to which an element at starting index 241 of first array 262, e.g., an element of lowest index of subarray 262, has been copied by replacement unit 233. For instance, in the example shown in Table 2, choice unit 232 may set starting index 246 to two since the first element of subarray [2 3 4], 262, has been copied to index two of second array 264. Choice unit 232 may data-obliviously compute starting index $j_s$ 246, e.g., from starting index $i_s$ 241 of subarray 262 in first array 261, e.g., second index 244 may be a function of first index 242 and choice unit 232 may compute starting index 246 by data-obliviously evaluating the function on starting index 241, for instance, choice unit 232 may data-obliviously compute $j_s = i_s$ mod n or $j_s = i_s$ mod m with n the length of subarray 262 and m the length of second array 264, depending on how second index 244 is selected. Computing the starting index is optional, e.g., the order of elements of the second array may be irrelevant, in which computing the starting index may be unnecessary.

In an embodiment, choice unit 232 computes starting index $j_s$ 246 as part of the element computation performed for each element at first index 242 in first array 261. In order to compute starting index 246, choice unit 232 may data-obliviously compare first index i 242 to starting index $i_s$ 241 of the subarray in the first array, e.g., choice unit 232 may data-obliviously compute a comparison value, e.g., a value $[i=i_s]$ that is equal to 1 if i is equal to $i_s$ and zero otherwise, and data-obliviously change starting index $j_s$ 246 to second index j 244 depending on the comparison value, e.g., $j_s = [i=i_s] \cdot j + (1-[i=i_s]) \cdot j_s = j_s + [i=i_s] \cdot (j-j_s)$.

Figure 3A:
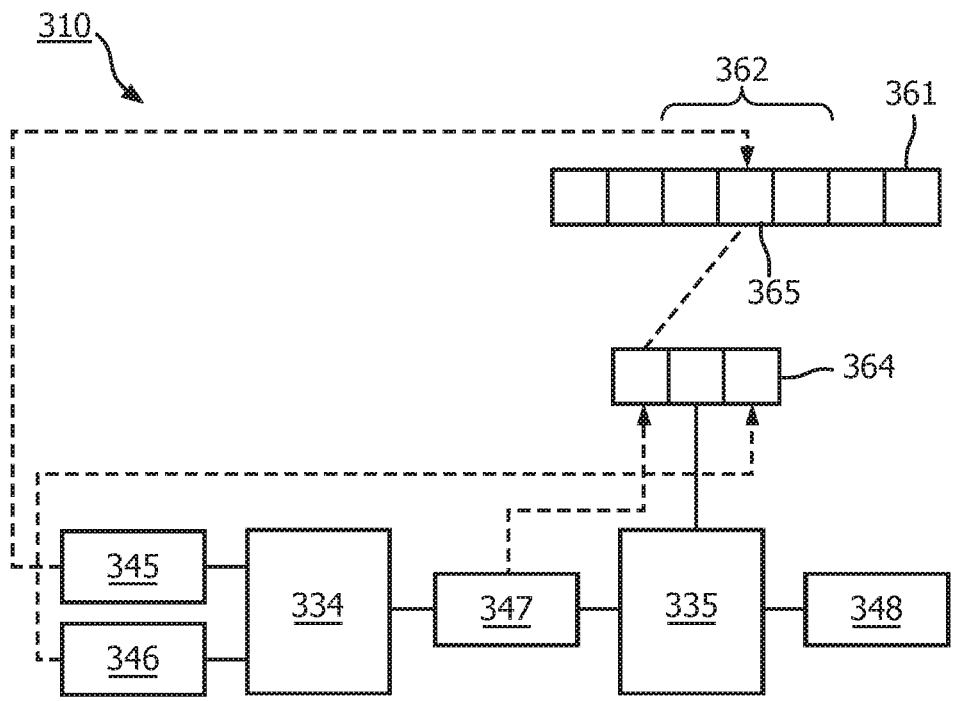

FIG. 3a schematically shows an example of an embodiment of a data retrieval device 310. Data retrieval device 310 may obtain a subarray index 345 of a target element 348, 365 in subarray 362. For instance, data retrieval device 310 may be instructed to obtain target element 365, e.g. by a request of a user or by a request of another unit of the device. Subarray index 345 may be equal to an index of target element 365 in subarray 362, e.g., it may be equal to an index of target element 365 in first array 361 minus a starting index of subarray 362 in first array 361. For instance, in the example shown in FIG. 3a, subarray index 345 may be one since target element 365 has index one in subarray 362.

Data retrieval device 310 may comprise a translation unit 334 configured to data-obliviously compute a translated index 347 of target element 365 in the second array from subarray index 345 and a starting index $i_s$ 346, e.g., a starting index of subarray 362 in first array 361, e.g., starting index 246 as described above. For instance, translation unit 334 may compute translated index 347 by translating subarray index 345 of target element 365 in subarray 362 to an index i of target element 365 in first array 361, e.g., $i = i_s + i'$, and translating the index i of the target element 365 in first array to translated index j 347, e.g., j=i mod n or j=i mod m with n the length of subarray 362 and m the length of second array 364, depending on how the second indices in second array 364 are selected for first indices of first array 361. For instance, in the example shown in FIG. 3a, translation unit 334 may determine that index i of target element 365 is i=2+1=3 since subarray 362 has starting index two 346 and subarray index 345 is one, and hence that translated index 347 is j=3 mod 3=0 since length n of subarray 362 and/or length m of second array 364 is three, hence second index 0 will be selected for first index 3 by a selection unit of data retrieval device 310, e.g., selection unit 231 of data retrieval device 210. Translation unit 334 may also directly compute translated index 347 from subarray index 345 and starting index 346, e.g., in embodiments where subsequent second indices are selected for subsequent first indices by a selection unit of the data retrieval device, translation unit 334 may compute translated index 347 from subarray index 345 and starting index 346, e.g., by adding them modulo the length of subarray 362 or second array 364, e.g., j=1+2 mod 3=0.

Data retrieval device 310 may further comprise a retrieval unit 335 configured to data-obliviously retrieve target element 348, 365 from the second array based on translated index 347. For example, techniques for secret indexing, e.g., data-obliviously retrieving an element of an array at a particular location that are known per se in the state of the art may be used. E.g., such techniques may comprise data-obliviously computing a bit vector, e.g., $(\delta_0, \ldots, \delta_{n-1})$, of length equal to the length of second array 364, respective bits of the bit vector indicating whether translated index j 347 corresponds to respective elements, e.g., $v_0, \ldots, v_{n-1}$, of second array 364, and data-obliviously computing an inner product between the bit vector and second array 364 to compute target element t 348, e.g., $t = \delta_0 v_0 + \ldots + \delta_{n-1} v_{n-1}$. For instance, in the example shown in FIG. 3a, retrieval unit 335 may retrieve the first element of second array 364, with index zero, e.g., equal to translated index 347, as target element 348. Interestingly, retrieving target element 348, 365 from the second array 364 in this way may be more efficient than retrieving it from first array 361, e.g., because the second array is smaller than the first array. In an embodiment, multiple target elements are retrieved for respective subarray indices, which may give a performance improvement for each retrieved target element.

Returning to FIG. 2a. Data retrieval device 210 may be configured to data-obliviously shift elements of second array 264 based on starting index 246, such that second array 264 starts with subarray 262 after the shifting. For example, the shift may be a cyclic left shift, a number of shift positions of the cyclic left shift corresponding to starting index 246. For example, as discussed above, in the example shown in Table 2, starting index 246 may be equal to two, hence data retrieval device 210 may data-obliviously cyclically left-shift elements of second array 264 by two positions. For example, data retrieval device 210 may comprise a shifting unit to perform the cyclic left-shift.

Figure 3B:
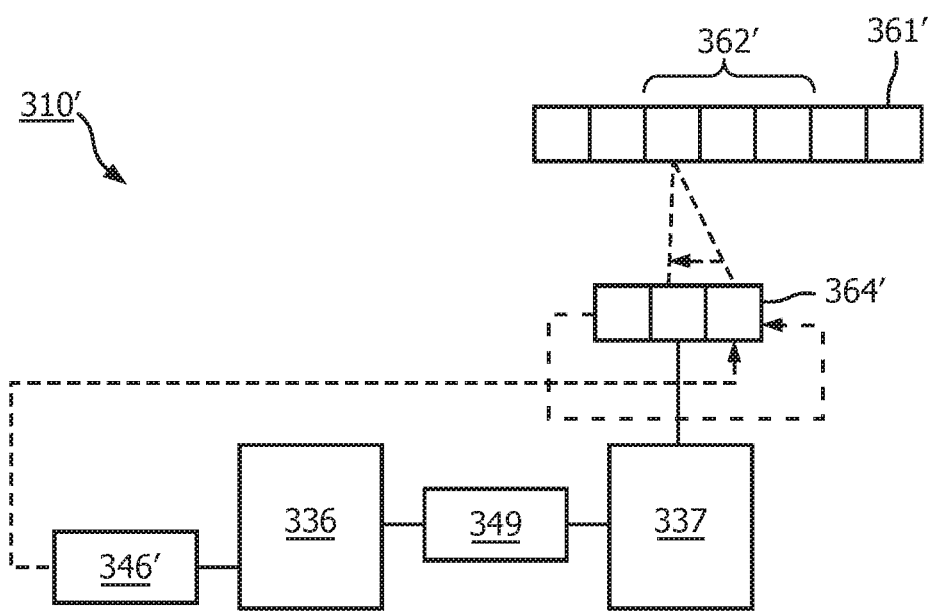

FIG. 3b schematically shows an example of an embodiment of a data retrieval device 310'. Data retrieval device 310' may data-obliviously shift elements of second array 364' by means of a shift checking unit 336 and/or a shifting unit 337. Shift checking unit 336 and shifting unit 337 may iteratively repeat a shift computation. The shift computation may comprise shift checking unit 336 data-obliviously computing shift bit 349 indicative of whether to perform a shift, and/or shifting unit 337 data-obliviously shifting elements of second array 364', e.g., cyclically left shifting, by one position if shift bit 349 indicates to perform a shift. In an embodiment, shifting unit 337 performs right shifts, e.g., cyclic right shifts by one position, e.g., a number of cyclic right shifts by one position corresponding to the length of second array 364' minus starting index 346'.

For example, the number times second array 364' needs to be shifted left by one position may be any number between zero, inclusive, and the length of second array 364', exclusive, and may correspond to starting index 346'. Hence, in order to data-obliviously perform the shift, shifting unit 337 may be activated a number of times corresponding to the length the second array m minus one, a number of times of which shift bit 349 is set that corresponds to starting index 346', the remainder of the times of which shift bit 349 is not set. In an embodiment, shift checking unit 336 data-obliviously compares a number of performed shift computations s to starting index $j_s$ 346' to compute shift bit $\Delta$, e.g., it computes $\Delta=[s \leq j_s]$, where $[s \leq j_s]$ is one if the number of performed shift operations is less than or equal to the starting index, and zero otherwise. Or, shifting unit 337 computes shift bit $\Delta$, 349, by initially setting it and resetting it if sufficient shifts have been performed, e.g., $\Delta = \Delta - [s=j_s]$. Shift checking unit 336 may also, e.g., data-obliviously randomly select $j_s$ out of the m−1 shift computations, or similar.

In order to data-obliviously shift elements $v_1, \ldots, v_m$ of second array 337 by one position if shift bit $\Delta$ 349 indicates to perform a shift, for example, shifting unit 337 may compute updated elements of second array 364', e.g., wherein an updated element of the second array corresponds to the element of the second array itself if the shift bit is not set and an element one position cyclically to the right of the element if the shift bit is set, e.g., $v_1 = v_1 + \Delta \cdot (v_2 - v_1), \ldots, v_{m-1} = v_{m-1} + \Delta \cdot (v_m - v_{m-1}), v_m = v_m + \Delta \cdot (v_1 - v_m)$.

For example, as shown in FIG. 3b, if starting index 346' points to the third element of second array 364' with index two before a left-shift, said element corresponding to a starting element of subarray 362' as indicated with a dashed line, then after a single left-shift, the second element of second array 364' may correspond to the starting element of subarray 362', as indicated with a dashed line. After another left-shift, the first element of second array 364' may correspond to the starting element of subarray 362' so that second array 364' starts with subarray 362' after the shifting.

Returning to FIG. 2a. In an embodiment, data retrieval device 210 uses Algorithm 1 below to data-obliviously copy subarray 262 of first array 261 to second array 264, e.g., selection unit 231, choice unit 232, and/or replacement unit 233 are configured to act according to the algorithm. Boldfaced variables in the algorithm may denote values with respect to which the algorithm is data-oblivious, e.g., variables whose value does not influence control flow and/or memory or storage accesses. For example, storage accesses etc. may not depend on starting index i, which may be sensitive, but they may depend on length l, which may be public. Similarly, loop variable j may be public so storage accesses etc. may depend on it (but, in turn, its value may not depend on any boldfaced variable). [•=•] may denote a data-oblivious equality test.

Algorithm 1. Data-oblivious copying of subarray 262 of first array 261 to second array 264

| | |
|---|---|
| Require: | A: first array 261; i: starting index 241 of subarray 262 in first array 261; l: length of subarray 262 |
| Ensure: | Returns (B; s) where second array B, 264, corresponds to subarray 262 of array A at starting index i 241 with length l, shifted cyclically to the right by starting index s, 246, number of positions |
| 1: function ArrayCopy(A; i; l) |
| 2: | B ← (0; ...; 0)  // array of length l |
| 3: | w ← 1 |
| 4: | s ← 0 |
| 5: | for j = 0; ...; \|A\| − 1 do |
| 6: |    B[j mod l] ← B[j mod l] + w · (A[j] − B[j mod l]) |
| 7: |    w ← w − [i = j + 1 − l] |

Algorithm 1. Data-oblivious copying of subarray 262 of first array 261 to second array 264 — continued

| | |
|---|---|
| 8: |    s ← s + [i = j] · ((j mod l) − s) |
| 9: | return (B; s) |

Algorithm 1 may perform a linear scan of element computations through first array 261 (lines 5-8). Throughout the scan, choice bit w 245 may represent whether data retrieval device 210 will still modify the contents of second array 264, e.g. whether first index j 242 is before the end of subarray 262. If this is the case, second array B, 264 may be updated at second index (j mod l) 244 with first element 263; otherwise, it may be not updated (line 6). Choice bit w 245 may be initially set to one, but it may be set to zero as soon as the end of subarray 262 has been reached, e.g., if first index j 242 equals i+l−1 (line 7). Starting index s 246 in the second array may be represent a shift: if first index j 242 is equal to starting index i 261 of subarray 262 in the first array, starting index s in the second array 246 may be set to a shift corresponding to first index i, 242, otherwise it may remain unchanged (line 8). Finally, the computed second array B 264 and starting index s in the second array 246 may be returned (line 9).

Returning to FIG. 3a. Algorithm 1 may return second array B 264 comprising shifted subarray 262 plus a starting index s 246 comprising a shift. Given a subarray index i 345 in subarray 262, data retrieval device 210 may retrieve a target element of subarray 262 in a data-oblivious way by computing translated index j, e.g., j=(s+i) mod|B|, in a data-oblivious way, and then data-obliviously retrieve the target element from second array B at location j in a data-oblivious way.

Returning to FIG. 3b. In an embodiment, data retrieval device 310' uses Algorithm 2 below to data-obliviously shift elements of second array 364' based on starting index 346' such that second array 364' starts with subarray 362' after the shifting. For example, shift checking unit 336 and/or shifting unit 337 are configured to act according to the algorithm. As above, boldfaced variables in the algorithm may denote values with respect to which the algorithm is data-oblivious, e.g., variables whose value may not influence control flow and/or memory or storage accesses. [•=•] may denote a data-oblivious equality test.

Algorithm 2. Data-oblivious shifting of second array 364' based on starting index 346'

| | |
|---|---|
| Require: | B: second array 364', s: starting index 346' |
| Ensure: | Second array B 364' is left-shifted by starting index s 346' positions |
| 1: function ArrayShift(B; s) |
| 2: | w ← 1 |
| 3: | for i = 0; ...; \|B\| − 2 do |
| 5: |    w ← w − [s = i] |
| 6: |    for j = 0; ...; \|B\| − 1 do B[j] ← B[j] + w · (B[(j + 1) mod \|B\|] − B[j]) |

Algorithm 2 may repeatedly left-shift second array 364' by one position at most |B| times. Specifically, in this algorithm, shift bit w 349 may determine whether still more left-shifts need to be applied; it may be set to zero ifs left-shifts have taken place (line 5) and if it is non-zero, the array may be left-shifted by one position (line 6).

Returning to FIG. 1c. In data retrieval system 102, two or more data retrieval devices, e.g., data retrieval device 112.1, 112.2 or 112.3, perform element computations as a multi-party computation. For example, data retrieval device 112.1 may be a data retrieval device 210 wherein element computations may comprise selection unit selecting a second index 242 in the second array, choice unit 232 data-obliviously computing a choice bit 245, and/or replacement unit 233 replacing a second element 265 by a data-obliviously set replacement element 247. Second array 264 and at least one of starting index 241 of the subarray in the first array and ending index 243 of the subarray in the first array may be private values of the multi-party computation. Interestingly, this may allow the data retrieval devices of data retrieval system 102 to copy subarray 262 of first array 261 to second array 264, without any individual data retrieval device needing to knowing the location of subarray 262 in first array 261 and/or the length of subarray 262, and while performing a number of data-oblivious computations corresponding to the number of element computations, e.g., scaling with the size of first array 262, e.g. scaling linearly.

Various multi-party computation techniques may be used to perform the multi-party computation. The multi-party computation may comprise other computations apart from copying subarray 262 to second array 264, e.g., the copying may be a subroutine of a larger computation. For instance, the multi-party computation may comprise an execution of the SPDZ protocol as detailed in Ivan Damgård, Valerio Pastro, Nigel P. Smart, Sarah Zakarias, "Multiparty Computation from Somewhat Homomorphic Encryption", Proceedings of CRYPTO 2012 (incorporated herein by reference), or any of its variants known from the state of the art. In an embodiment, Algorithm 1 and/or Algorithm 2 are used to compute second array 264 and/or retrieve a target element. Boldfaced variables of the algorithms may correspond to secret, e.g., secret-shared or encrypted, data of the multi-party computation and non-boldfaced variables may correspond to public, e.g. not encrypted or secret-shared, data. In particular, an operation [a=b] is used in Algorithm 1 and/or 2 returning 1 if a sensitive value a is equal to a non-sensitive value b, and 0 otherwise. This operation may be implemented, e.g., with the EQZ protocol from as described in "Design of large scale applications of secure multiparty computation: secure linear programming", S. de Hoogh, PhD thesis, Eindhoven University of Technology (incorporated herein by reference).

Returning to FIG. 1d. In data retrieval system 103, data retrieval device 113 may be configured to perform element computations as a verifiable computation, for example, element computations comprising selecting a second index in the second array for the first index in the first array, data-obliviously computing a choice bit, and/or replacing a second element at the second index in the second array by a data-obliviously set replacement element. A cryptographic verifiable computation proof 183 may prove that the element computations were performed correctly, data retrieval device 113 sending cryptographic verifiable computation proof 183 to retrieval verification device 114. For example, data retrieval device 113 may be a data retrieval device 210 wherein selection unit 231, choice unit 232, and/or replacement unit 233 are configured to perform at least some of their computations as a verifiable computation. Second array 264 and at least one of starting index 241 of the subarray in the first array and ending index 243 of the subarray in the first array may be private values of the verifiable computation. Interestingly, this may allow data retrieval device 113 to prove to the data retrieval device that subarray 262 was correctly copied to second array 264, without needing to disclose starting index 241 and/or ending index 243 to the data retrieval device, and/or without key material needed to verify the cryptographic verifiable computation proof needing to depend on the starting index or the ending index, while performing a verifiable computation with complexity matching the number of element computations, e.g., scaling with the size of first array 262, e.g. scaling linearly.

Retrieval verification device 114 may be for verifying that a subarray of a first array was data-obliviously copied to a second array by data retrieval device 113. The length of the second array may be more than one and less than the length of the first array. The length of the subarray may be at most the length of the second array. Retrieval verification device may be configured to receive from data retrieval device 113 cryptographic verifiable computation proof 183 proving that element computations were performed correctly, the element computations being performed by data retrieval device 113 as a verifiable computation as described above. Retrieval verification device 113 may be further configured to verify cryptographic verifiable computation proof 183 to verify that the subarray of the first array was data-obliviously copied to the second array by data retrieval device 113.

Various verifiable computation techniques may be used to perform and/or verify the verifiable computation. The verifiable computation may comprise other computations as well, e.g., copying subarray 262 to second array 264 may be a subroutine of a larger computation. For instance, performing the verifiable computation may comprise evaluating the Compute function of B. Parno et al., "Pinocchio: Nearly Practical Verifiable Computation", Proceedings of the IEEE Symposium on Security and Privacy 2013 (incorporated herein by reference) using an evaluation key, or any of its variants known from the state of the art. Similarly, verifying the cryptographic verifiable computation proof may comprise evaluating the Verify function of "Pinocchio: Nearly Practical Verifiable Computation" using a verification key corresponding to the evaluation key. For example, the evaluation key and/or the verification key may be generated by retrieval verification device 114 or by a third party. Cryptographic verifiable computation proof 183 may or may not be a zero-knowledge proof. In either case, the use of a data-oblivious algorithm may allow the same key material to be used regardless of the location of subarray 262 in first array 261. In an embodiment, cryptographic verifiable computation proof 183 is a zero-knowledge proof, which may prevent the location of subarray 262 in first array 261 leaking from, e.g., being derivable from, the proof 183.

In an embodiment, Algorithm 1 and/or Algorithm 2 are used to compute second array 264 and/or retrieve a target element. Boldfaced variables of the algorithms may correspond to inputs, outputs, and/or witnesses of the verifiable computation and non-boldfaced variables may correspond to constants. In particular, an operation [a=b] is used in Algorithm 1 and/or 2 returning 1 if a sensitive value a is equal to a non-sensitive value b, and 0 otherwise. This operation may be implemented using the zero-equality gate from "Pinocchio: Nearly Practical Verifiable Computation", e.g., noting that [a=b], e.g., (a=b)? 1:0, may be implemented as 1−[a−b≠0], e.g., 1−(a−b≠0? 1:0)).

Figure 4A:
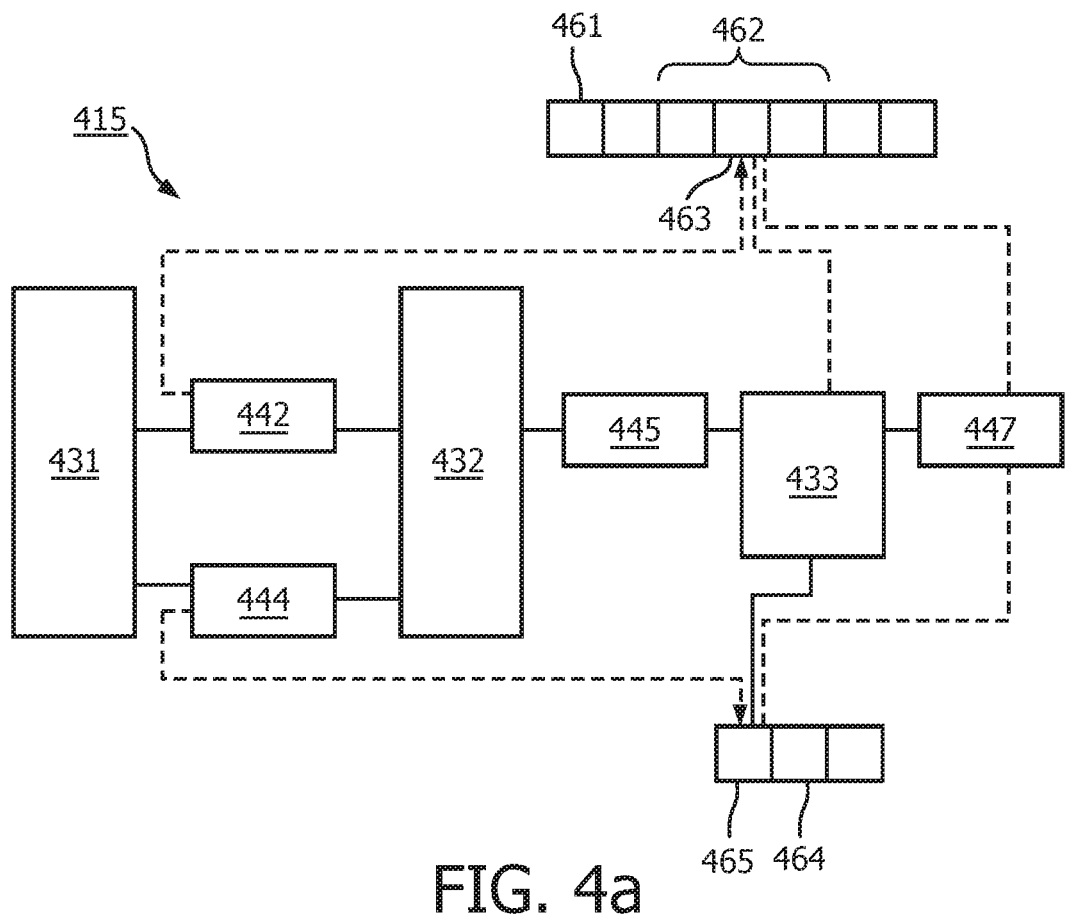

Turning now to FIG. 4a. FIG. 4a schematically shows an example of an embodiment of a data writing device 415 for data-obliviously copying a second array 464 to a subarray 462 of a first array 461. The length of second array 464 may more than one and/or less than the length of first array 461. The length of subarray 462 may be at most the length of second array 464. In an embodiment, the length of subarray 462 is equal to the length of second array 464. In an embodiment, the copying is data-oblivious with respect to at least one of a starting index of subarray 462 in first array 461 and an ending index of subarray 462 in first array 461.

Data writing device 415 may perform an element computation for each first element 463 at a first index 442 in first array 461, e.g., by means of a selection unit 431, a choice unit 432, and/or a replacement unit 433. In an embodiment, the element computation is performed for each first element 463 at a first index 442 in first array 461 by iterating through the first array linearly. This may have as an advantage that This may have the advantage of making data writing device 415 less susceptible to side-channel analysis and/or allowing data retrieval device 415 to perform the copying using cryptographic techniques such as multi-party computation and/or verifiable computation while having to perform a reduced amount of work, e.g., work that is linear in the size of first array 461.

Data writing device 415 may comprise a selection unit 431 that selects a second index 444 in second array 464 for first index 442 in first array 461. Selection unit 431 may select different second indices for first indices of first array 461 that differ by less than the length of subarray 462. Various examples of embodiments of selection units have been described above, e.g., selection unit 431 may be configured similarly to selection unit 231 of data retrieval device 210. In an embodiment, second index 444 is a function of first index 442 or first index 442 and second index 444 are functions of a counter variable. In an embodiment, second index 444 is first index 442 modulo the length of second array 464 or the length of subarray 462.

Data writing device 415 may further comprise a choice unit 432 that data-obliviously computes a choice bit 445 indicative of whether to copy a second element 465 at second index 444 in second array 464 to first index 442 in first array 461. Choice bit 445 may at least indicate if subarray 462 comprises first element 463. Various examples of embodiments of choice units have been described above, e.g., choice unit 432 may be configured similarly to choice unit 232 of data retrieval device 210. In an embodiment, data-obliviously computing choice bit 445 comprises data-obliviously comparing first index 442 to a starting index or an ending index of subarray 462 in the first array. In an embodiment, choice bit c 445 initially indicates to copy second elements to first indices in first array 461, and is changed by choice unit 432 to indicate not to copy second elements to first indices in first array 461 after element computations have been performed for all elements of subarray 462.

Data writing device 415 may further comprise a replacement unit 433 that replaces first element 463 at the first index in the first array by a replacement element 447. Replacement unit 433 may data-obliviously set replacement element 447 to first element 463 or second element 465 based on choice bit 445, e.g., like replacement unit 233 of data retrieval device 210. In an embodiment, replacement unit 433 applies a function to replacement element r 447 prior to replacing first element 463 by the replacement element.

Figure 4B:
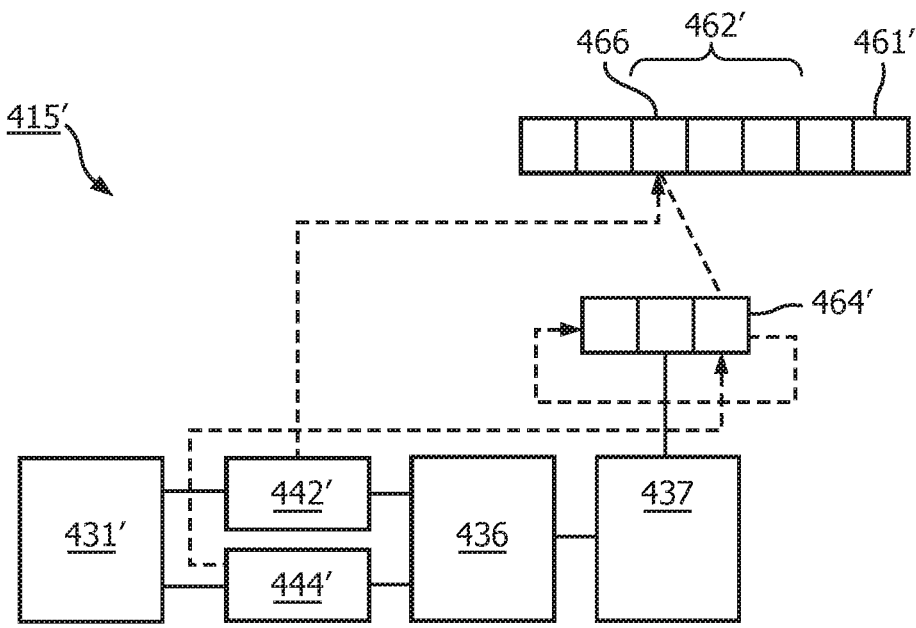

FIG. 4b schematically shows an example of an embodiment of a data writing device 415'. Data writing device 415' may comprise a selection unit 431', a shift checking unit 436, and/or a shifting unit 437. Selection unit 431' may be configured to, before element computations are performed, e.g., by a selection unit, a choice unit, and/or a replacement unit of data writing device 415', data-obliviously determine a second index 444' in the second array that will be selected for a starting index 442' in the first array of a starting element 466 of the subarray. For example, data writing device 415' may obtain starting index 442' as an input, e.g., by a user, or by another unit that requires data-obliviously copying a second array to a subarray of a first array as a subroutine. For example, second index j 444' in the second array that will be selected for starting index i 442' in the first array may be a function of starting index 442', e.g., j=i mod n where n is the length of subarray 462' or j=i mod m where m is the length of second array 464', and selection unit 431' may be configured to data-obliviously evaluate this function in order to obtain second index 444'. Further examples of second indices being selected for first indices, e.g., starting indices, are described herein with reference to selection unit 231.

Shift checking unit 436 and/or shifting unit 437 may be configured to data-obliviously shift elements of second array 464' based on second index 444' such that an element at second index 444' in the second array after the shifting corresponds to a starting element of the second array before the shifting. This may have as advantage that elements of second array 464' end up in their original order in first array 461', e.g., without a cyclic shift. Shifting is optional, however, e.g., the order in which elements of the second array are copied into the first array may be irrelevant in some applications.

For example, the data-obliviously shifting may comprise data-obliviously right-shifting, e.g., cyclically, elements of second array 464' by a number of positions corresponding to second index 444'. For example, shift checking unit 436 and shifting unit 437 may iteratively repeat a shift computation. The shift computation may comprise shift checking unit 436 data-obliviously computing a shift bit indicative of whether to perform a shift, and/or shifting unit 437 data-obliviously shifting elements of second array 464', e.g., cyclically right-shifting by one position, if the shift bit indicates to perform a shift. For example, shift checking unit 436 and/or shifting unit 437 may be configured similarly to shift checking unit 336 and shifting unit 337, respectively, for example, adapted to perform right-shifting instead of left-shifting, or adapted to perform left-shifting by m−j times instead of j times, where m is the length of second array 464' and j is second index 444'.

Returning to FIG. 1g. In an embodiment of a data writing system 107, data writing device 117.1, 117.2, and/or 117.3, e.g., data writing device 415, are configured to perform element computations as a multi-party computation with each other, analogously to data retrieval system 102. E.g., first array 461 and at least one of a starting index of subarray 462 in the first array and an ending index of subarray 462 in the first array may be private values of the multi-party computation. This may have as an advantage that the data writing devices are able to copy the second array to the subarray of the first array without any individual data writing device needing to know the location of subarray 462 in the first array and/or the length of subarray 462, while performing a reduced amount of work, e.g., work that scales with the size of first array 461, e.g., linearly.

Returning to FIG. 1h. In an embodiment of a data writing system 108, data writing device 118, e.g., data writing device 415, is configured to perform element computations as a verifiable computation, analogously to data retrieval system 103. Cryptographic verifiable computation proof 188 may prove that the element computations were performed correctly. Data writing device 118 may be further configured to send cryptographic verifiable computation proof 188 to writing verification device 119. For example, first array 461 and at least one of a starting index of subarray 462 in the first array and an ending index of subarray 462 in the first array may be private values of the verifiable computation.

Writing verification device 119 may be for verifying that a second array was data-obliviously copied to a subarray of a first array by data writing device 118. The length of the second array may be more than one and less than the length of the first array. The length of the subarray may be at most the length of the second array. Writing verification device 119 may be configured to receive from data writing device 118 a cryptographic verifiable computation proof 188 proving that element computations were performed correctly, the element computations being performed as a verifiable computation as described above. Writing verification device 119 may be further configured to verify cryptographic verifiable computation proof 188 to verify that the second array was data-obliviously copied to the subarray of the first array by data writing device 118.

Interestingly, this may enable data writing device 118 to prove to writing verification device 119 that the second array was correctly copied to the first array without needing to disclose a starting index and/or an ending index and/or a length of the subarray, and/or without key material of the verifiable computation needing to depend on these values, e.g., while performing the verifiable computation with reduced computation complexity, e.g. scaling with the size of the first array, e.g., scaling linearly.

In the various embodiments of the data retrieval device, the data writing device, the retrieval verification device, and the writing verification device, the communication interface may be selected from various alternatives. For example, the interface may be a network interface to a local or wide area network, e.g., the Internet, a storage interface to an internal or external data storage, a keyboard, an application interface (API), etc. The various devices may have respective user interfaces, which may include well-known elements such as one or more buttons, a keyboard, display, touch screen, etc. For example, the user interface of the data retrieval device may be arranged for accommodating user interaction for performing a copying of a subarray of a first array to a second array, and similarly for the other devices.

Storage 150, 151, 155, 156 may be implemented as an electronic memory, say a flash memory, or magnetic memory, say a hard disk or the like. Respective storages may comprise multiple discrete memories together making up said storage. Respective storages may also be a temporary memory, say a RAM. In the case of a temporary storage, the storage contains some means to obtain data before use, say by obtaining them over an optional network connection (not shown in all figures).

Typically, the data retrieval device, the data writing device, the retrieval verification device, and the writing verification device each comprise a microprocessor which executes appropriate software stored at the respective devices; for example, that software may have been downloaded and/or stored in a corresponding memory, e.g., a volatile memory such as RAM or a non-volatile memory such as Flash. The respective devices may also be equipped with microprocessors and memories. Alternatively, the respective devices may, in whole or in part, be implemented in programmable logic, e.g., as field-programmable gate array (FPGA). The respective devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, data retrieval device 110, 111 comprises a selection circuit, a choice circuit, and a replacement circuit. The device 110, 111 may comprise additional circuits, e.g., a translation circuit, a retrieval circuit, a shift checking circuit, and/or a shifting circuit. In an embodiment, data writing device 115, 116 comprises a selection circuit, a choice circuit, and a replacement circuit. The device 115, 116 may comprise additional circuits, e.g., a shift checking circuit and/or a shifting circuit. The circuits implement the corresponding units described herein. The circuits may be a processor circuit and storage circuit, the processor circuit executing instructions represented electronically in the storage circuits. The circuits may also be, FPGA, ASIC or the like. The processor may be processor circuit, which may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 5A:
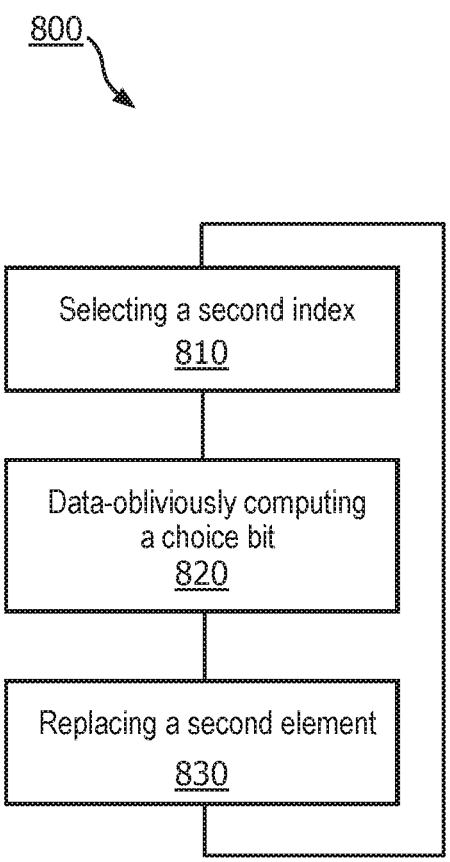

FIG. 5a schematically shows an example of an embodiment of a data retrieval method 800. Data retrieval method 800 may be for data-obliviously copying a subarray of a first array to a second array. The length of the second array may be more than one and/or less than the length of the first array. The length of the subarray may be at most the length of the second array. Data retrieval method 800 may comprise performing an element computation for each first element at a first index in the first array, the element computation comprising:

selecting 810 a second index in the second array for the first index in the first array, wherein different second indices are selected for first indices of the first array that differ by less than the length of the subarray;

data-obliviously computing 820 a choice bit indicative of whether to copy the first element to the second index in the second array, wherein the choice bit at least indicates if the subarray comprises the first element;

replacing 830 a second element at the second index in the second array by a replacement element, the replacement element being data-obliviously set to the first element or the second element based on the choice bit.

Figure 5B:
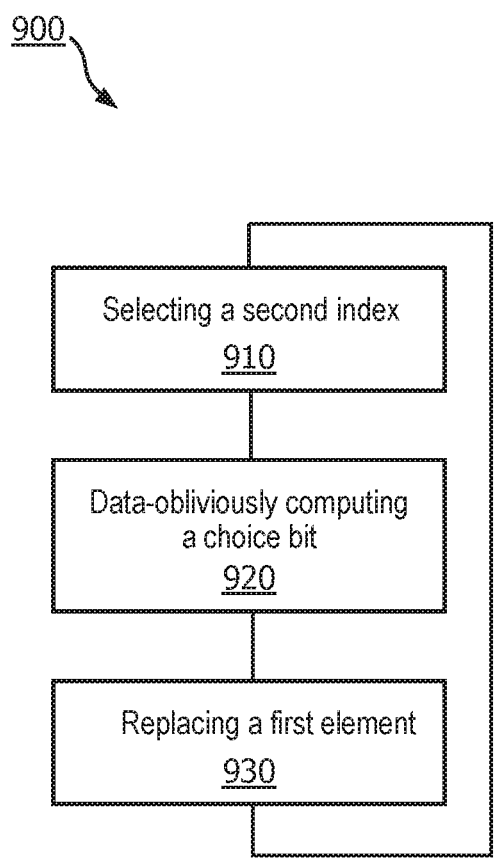

FIG. 5b schematically shows an example of an embodiment of a data writing method 900. Data writing method 900 may be for data-obliviously copying a second array to a subarray of a first array. The length of the second array may be more than one and/or less than the length of the first array. The length of the subarray may be at most the length of the second array. Data writing method 900 may comprise performing an element computation for each first element at a first index in the first array, the element computation comprising:

selecting 910 a second index in the second array for the first index in the first array, wherein different second indices are selected for first indices of the first array that differ by less than the length of the subarray;

data-obliviously computing 920 a choice bit indicative of whether to copy a second element at the second index in the second array to the first index in the first array, wherein the choice bit at least indicates if the subarray comprises the first element;

replacing 930 a first element at the first index in the first array by a replacement element, the replacement element being data-obliviously set to the first element or the second element based on the choice bit.

Many different ways of executing the data retrieval and data writing methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 820, 830 of different element computations may be executed, at least partially, in parallel. Moreover, a given step may not have finished completely before a next step is started.

Embodiments of the methods may be executed using software, which comprises instructions for causing a processor system to perform method 800 and/or 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
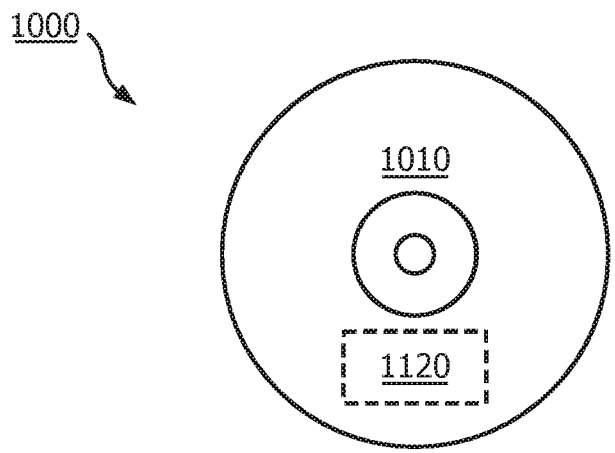

FIG. 6a shows a computer readable medium 1000 having a writable part 1010 comprising a computer program 1020, the computer program 1020 comprising instructions for causing a processor system to perform a data retrieval method or a data writing method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said data retrieval method or data writing method.

Figure 6B:
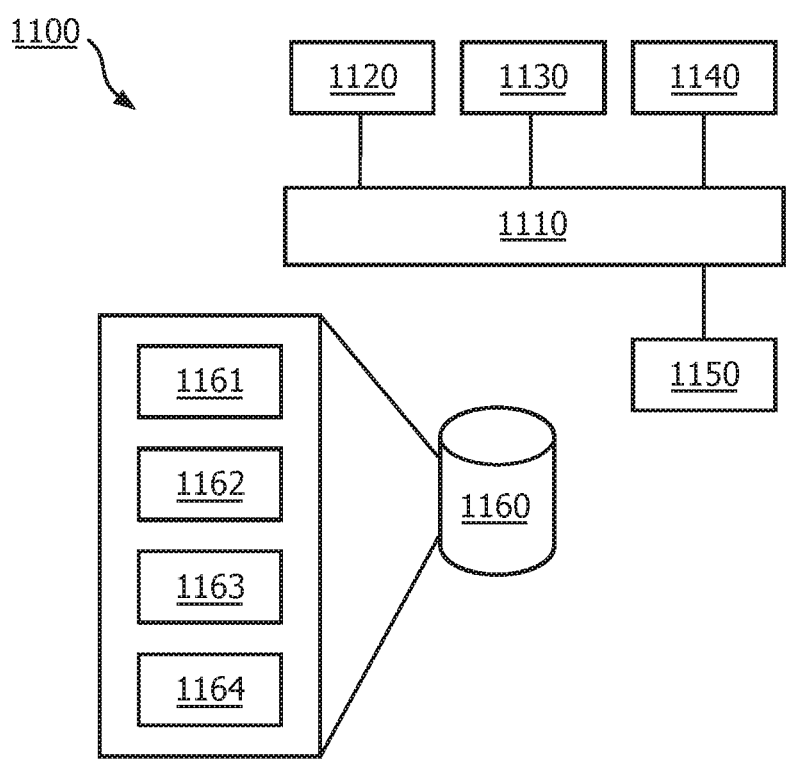

FIG. 6b illustrates an exemplary hardware diagram 1100 for implementing a device according to an embodiment, e.g., a data retrieval device, a data writing device, a retrieval verification device, or a writing verification device. The exemplary hardware 1100 may correspond to one or more data retrieval devices of FIG. 1a or FIG. 1b, one or more data writing devices of FIG. 1e or FIG. 1f, one or more retrieval verification devices of FIG. 1d, or one or more writing verification devices of FIG. 1h. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for a data retrieval device to select a second index in a second array, instructions 1163 to data-obliviously compute a choice bit and/or instructions 1164 to replace a second element at the second index in the second array, etcetera. Or, the storage may store instructions 1162 for a data writing device to select a second index in a second array, instructions 1163 to data-obliviously compute a choice bit and/or instructions 1164 to replace a first element at a first index in a first array, etcetera. Or, the storage may store instructions 1162 for a retrieval verification device to receive a cryptographic verifiable computation proof and/or instruction 1163 to verify the cryptographic verifiable computation proof. Or, the storage may store instructions 1162 for a writing verification device to receive a cryptographic verifiable computation proof and/or instruction 1163 to verify the cryptographic verifiable computation proof.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A data retrieval device for data-obliviously copying a subarray of a first array to a second array, the length of the second array being more than one and less than the length of the first array, the length of the subarray being at most the length of the second array, the data retrieval device comprising:
    a storage configured to store the first array and the second array;
    a processor configured to perform an element computation for each first element at a first index in the first array, the element computation comprising:
        selecting a second index in the second array for the first index in the first array, wherein different second indices are selected for first indices of the first array that differ by less than the length of the subarray;
        data-obliviously computing a choice bit indicative of whether to copy the first element to the second index in the second array, wherein the choice bit at least indicates if the subarray comprises the first element; and
        replacing a second element at the second index in the second array by a replacement element, the replacement element being data-obliviously set to the first element or the second element based on the choice bit; and
    a communication interface configured for digital communication with a retrieval verification device, wherein the processor is further configured to:
        perform element computations as a verifiable computation using a cryptographic verifiable computation proof proving that the element computations were performed correctly;
        send, via the communication interface, the cryptographic verifiable computation proof to the retrieval verification device, the second array, and at least one of a starting index of the subarray in the first array and an ending index of the subarray in the first array being private values of the verifiable computation.

2. A data retrieval device as in claim 1, wherein the copying is data-oblivious with respect to at least one of a starting index of the subarray in the first array and an ending index of the subarray in the first array.

3. A data retrieval device as in claim 1, wherein the second index is a function of the first index or the first index and the second index are functions of a counter variable.

4. A data retrieval device as in claim 3, wherein the second index is the first index modulo the length of the second array.

5. A data retrieval device as in claim 1, wherein data-obliviously computing the choice bit comprises data-obliviously comparing the first index to a starting index or an ending index of the subarray in the first array.

6. A data retrieval device as in claim 1, the processor being further configured to data-obliviously compute a starting index of the subarray in the second array.

7. A data retrieval device as in claim 6, the processor being further configured to:
    obtain a subarray index of a target element in the subarray;
    data-obliviously compute a translated index of the target element in the second array from the subarray index and the starting index;
    data-obliviously retrieve the target element from the second array based on the translated index.

8. A data retrieval device as in claim 6, the processor being further configured to data-obliviously shift elements of the second array based on the starting index such that the second array starts with the subarray after the shifting.

9. A data retrieval device as in claim 1, the data retrieval device further comprising a communication interface configured for digital communication with one or more other data retrieval devices, the processing being configured to perform element computations as a multi-party computation with the one or more other data retrieval devices, the second array and at least one of a starting index of the subarray in the first array and an ending index of the subarray in the first array being private values of the multi-party computation.

10. A data writing device for data-obliviously copying a second array to a subarray of a first array, the length of the second array being more than one and less than the length of the first array, the length of the subarray being at most the length of the second array, the device comprising:
    a storage configured to store the first array and the second array; and a processor configured to perform an element computation for each first element at a first index in the first array, the element computation comprising:

selecting a second index in the second array for the first index in the first array, wherein different second indices are selected for first indices of the first array that differ by less than the length of the subarray;

data-obliviously computing a choice bit indicative of whether to copy a second element at the second index in the second array to the first index in the first array, wherein the choice bit at least indicates if the subarray comprises the first element;

replacing a first element at the first index in the first array by a replacement element, the replacement element being data-obliviously set to the first element or the second element based on the choice bit; and a communication interface configured for digital communication with a retrieval verification device, wherein the processor is further configured to:

perform element computations as a verifiable computation using a cryptographic verifiable computation proof proving that the element computations were performed correctly;

send, via the communication interface, the cryptographic verifiable computation proof to the retrieval verification device, the second array, and at least one of a starting index of the subarray in the first array and an ending index of the subarray in the first array being private values of the verifiable computation.

11. A data writing device as in claim 10, wherein the processor is further configured to, before performing the element computations:

data-obliviously determine a second index in the second array that will be selected for a starting index in the first array of a starting element of the subarray; and data-obliviously shift elements of the second array based on the second index such that an element at the second index in the second array after the shifting corresponds to a starting element of the second array before the shifting.

* * * * *